US008914164B1

(12) United States Patent
Nathan et al.

(10) Patent No.: US 8,914,164 B1
(45) Date of Patent: Dec. 16, 2014

(54) SYSTEM AND METHOD FOR COMPUTING MACH NUMBER AND TRUE AIRSPEED

(71) Applicant: Honeywell International Inc., Morristown, NJ (US)

(72) Inventors: Visvanathan Thanigai Nathan, Karnataka (IN); Thanga Anandappan, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/958,307

(22) Filed: Aug. 2, 2013

(51) Int. Cl.
  G01C 23/00 (2006.01)
  G01P 5/175 (2006.01)
  B64D 43/02 (2006.01)
  G01P 3/62 (2006.01)
  G01P 5/16 (2006.01)
  G01P 21/00 (2006.01)
  G01P 3/50 (2006.01)

(52) U.S. Cl.
  CPC .............. *B64D 43/02* (2013.01); *G01P 5/175* (2013.01); *G01C 23/00* (2013.01); *G01P 3/62* (2013.01); *G01P 5/16* (2013.01); *G01P 21/00* (2013.01); *G01P 3/50* (2013.01)
  USPC ................... 701/7; 701/14; 702/144; 73/488; 324/161

(58) Field of Classification Search
  CPC ........... G01C 23/00; G01P 5/175; G01P 3/50; G01P 3/62; G01P 21/00; G01P 5/16
  USPC ................... 701/3, 4, 7, 14; 702/144; 73/488; 324/161
  See application file for complete search history.

(56) References Cited

U.S. PATENT DOCUMENTS

| 4,319,333 | A  | * | 3/1982 | Hedrick ......................... 702/144 |
| 6,324,448 | B1 | * | 11/2001 | Johnson ............................ 701/7 |
| 6,430,479 | B1 | * | 8/2002 | Johnson ............................ 701/7 |
| 6,761,057 | B2 | * | 7/2004 | Cronin et al. .................. 73/1.78 |
| 7,031,811 | B2 | * | 4/2006 | Parsons et al. .................... 701/7 |
| 7,047,113 | B1 |   | 5/2006 | Burch et al. |
| 2009/0112535 | A1 | * | 4/2009 | Phillips ............................ 703/2 |
| 2011/0184592 | A1 |   | 7/2011 | Elias et al. |
| 2011/0238373 | A1 |   | 9/2011 | Foster et al. |
| 2012/0158220 | A1 | * | 6/2012 | Accardo et al. ................. 701/15 |

FOREIGN PATENT DOCUMENTS

JP          H10227808 A        8/1998

OTHER PUBLICATIONS

Foster, J.V., et al.; A GPS-Based Pitot-Static Calibration Method Using Global Output-Error Optimization; NASA Langley Research Center, Hampton, VA; American Institute of Aeronautics and Astronautics, Jan. 2010, pp. 1-16.

(Continued)

*Primary Examiner* — Russell Frejd
(74) *Attorney, Agent, or Firm* — Ingrassia Fisher & Lorenz, P.C.

(57) ABSTRACT

A system and method are provided for calculating Mach number and true airspeed without reference to data from a pitot static sensor. The true airspeed and Mach number are calculated using the altitude information from GPS, IRS, Radio Altimeter and other onboard sensors other than the air data computer (ADC). The computed true airspeed or Mach number could be used to confirm the ADC information or in lieu of the ADC information when the ADC information is unreliable or unavailable.

16 Claims, 6 Drawing Sheets

(56) References Cited

OTHER PUBLICATIONS

Chen, Y., et al.; Data Hybridization Computation Analysis of Aircraft Air Data Inertial Reference System; Engineering and Technology Training Center, Civil Aviation University of China; 978-1-4577-0536-6/11 2011 IEEE, pp. 4604-4607.

Knoedler, A. J., et al.; Investigation of Global Positioning System Use for Air Data System Calibration; US Air Force Test Pilot School, Edwards AFB, CA., Apr. 1996, pp. 559-566.

CSG Networks; True Airspeed Calculator VIA GPS; http://www.csgnetwork.com/tasgpscale.htm, pp. 1-2.

* cited by examiner

SYSTEM AND METHOD FOR COMPUTING MACH NUMBER AND TRUE AIRSPEED

TECHNICAL FIELD

The exemplary embodiments described herein generally relates to computing MACH number and true airspeed and more particularly to computing MACH number and true airspeed when a pitot tube is unavailable or malfunctioning.

BACKGROUND

Measurement, computation, and display of true airspeed (TAS), MACH number (MN), and/or calibrated airspeed (CAS), as well as altitude, enables a pilot to maintain a recommended safe airspeed. Typically, these airspeeds (TAS, MN, CAS) and altitude are provided by an air data computer (ADC) that receives pertinent information from pitot static sensors. The ADC and pitot sensors typically include redundancies for high reliability; however, failures still occur resulting in improper aircraft operation.

Despite these multiple redundancies, maintenance safety, damage avoidance either on ground or in flight, and numerous pre-flight checks, a chance of malfunctioning of the pitot static sensor remains. In addition, the typically highly reliable ADC also may become undependable, providing incorrect information. It is therefore essential to have an alternate method of MN and TAS computation adapted for general aviation, business, regional and helicopters, and air transport aircraft either with or without a flight management system.

Accordingly, it is desirable to provide a system and method for calculating Mach number and true airspeed for comparison with, or in lieu of, a pitot static sensor. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for computing MACH number and true airspeed when a pitot tube is unavailable or malfunctioning.

In an exemplary embodiment, a method for determining at least one of a first true airspeed or a first Mach number of an aircraft in flight comprises sensing an air velocity and a first altitude by a pitot static sensor; providing at least one of a second true airspeed and a second Mach number by an air data computer coupled to the pitot static sensor and in response to the air velocity and the first altitude; storing within a storage medium standard atmospheric data, thrust data, wing surface area, and a coefficient of lift for the aircraft; determining by a flight management system a load factor and a weight of the aircraft; determining a second altitude by an altitude sensor; determining an angle of attack by a sensor on the aircraft; sensing a temperature of the air adjacent the aircraft; and determining, from the group consisting of the standard atmospheric data, the thrust data, the wing surface area, the coefficient of lift, the load factor, the weight, the second altitude, the temperature, and the angle of attack, at least one of the first true airspeed or first Mach number, by a processor coupled to the storage medium, the flight management system, the altitude sensor, and the temperature sensor.

In another exemplary embodiment, a method of determining at least one of a true airspeed or a Mach number of an aircraft in flight comprises storing within a storage medium standard atmospheric data, thrust data, wing surface area, and a coefficient of lift for the aircraft; determining by a flight management system a load factor and a weight of the aircraft; determining an altitude by an altitude sensor; determining an angle of attack by a sensor on the aircraft; sensing a temperature of the air adjacent the aircraft; and determining, from the group consisting of the standard atmospheric data, the thrust data, the wing surface area, the coefficient of lift, the load factor, the weight, the altitude, the temperature, and the angle of attack, the true airspeed or the Mach number, by a processor coupled to the storage medium, the flight management system, the altitude sensor, and the temperature sensor.

In yet another exemplary embodiment, a system for determining at least one of a first true airspeed or a first Mach number of an aircraft in flight comprises a pitot static sensor configured to sense an air velocity and a first altitude; an air data computer coupled to the pitot static sensor and configured to provide at least one of a second true airspeed and a second Mach number; a storage medium configured to store standard atmospheric data, thrust data, wing surface area, and a coefficient of lift for the aircraft; a flight management system configured to determine a load factor and a weight of the aircraft; an altitude sensor configured to determine a second altitude; a temperature sensor configured to determine a temperature; a sensor configured to determine an angle of attack; and a processor coupled to the storage medium, the flight management system, the altitude sensor, and the temperature sensor, and configured to determine, from the group consisting of the standard atmospheric data, the thrust data, the wing surface area, the coefficient of lift, the load factor, the weight, the second altitude, the temperature, and an angle of attack, at least one of the first true airspeed or first Mach number.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Alternate embodiments of the present invention to those described below may utilize whatever navigation system signals are available, for example a ground based navigational system, a GPS navigation aid, a flight management system, and an inertial navigation system, to dynamically calibrate and determine required information.

A system and method for computing true airspeed and Mach number is necessitated in spite of redundant pitot tubes architecture and air data computer (ADC) reliability. The exemplary embodiments described herein do not need any additional instrumentation than that already found onboard current day aircraft (and that are not already found). The true airspeed and Mach number are calculated using the altitude information from GPS, IRS, Radio Altimeter and other onboard sensors other than the ADC. The computed true airspeed or Mach number could be used to confirm the ADC information or in lieu of the ADC information when the ADC information is unreliable or unavailable. The ADC computed information typically will be more accurate; however, the calculated true airspeed and Mach number obtained from the proposed method could be used to confirm the ADC information is reliable (check if the ADC information is with a threshold of the computed true airspeed and Mach number).

Figure 1:
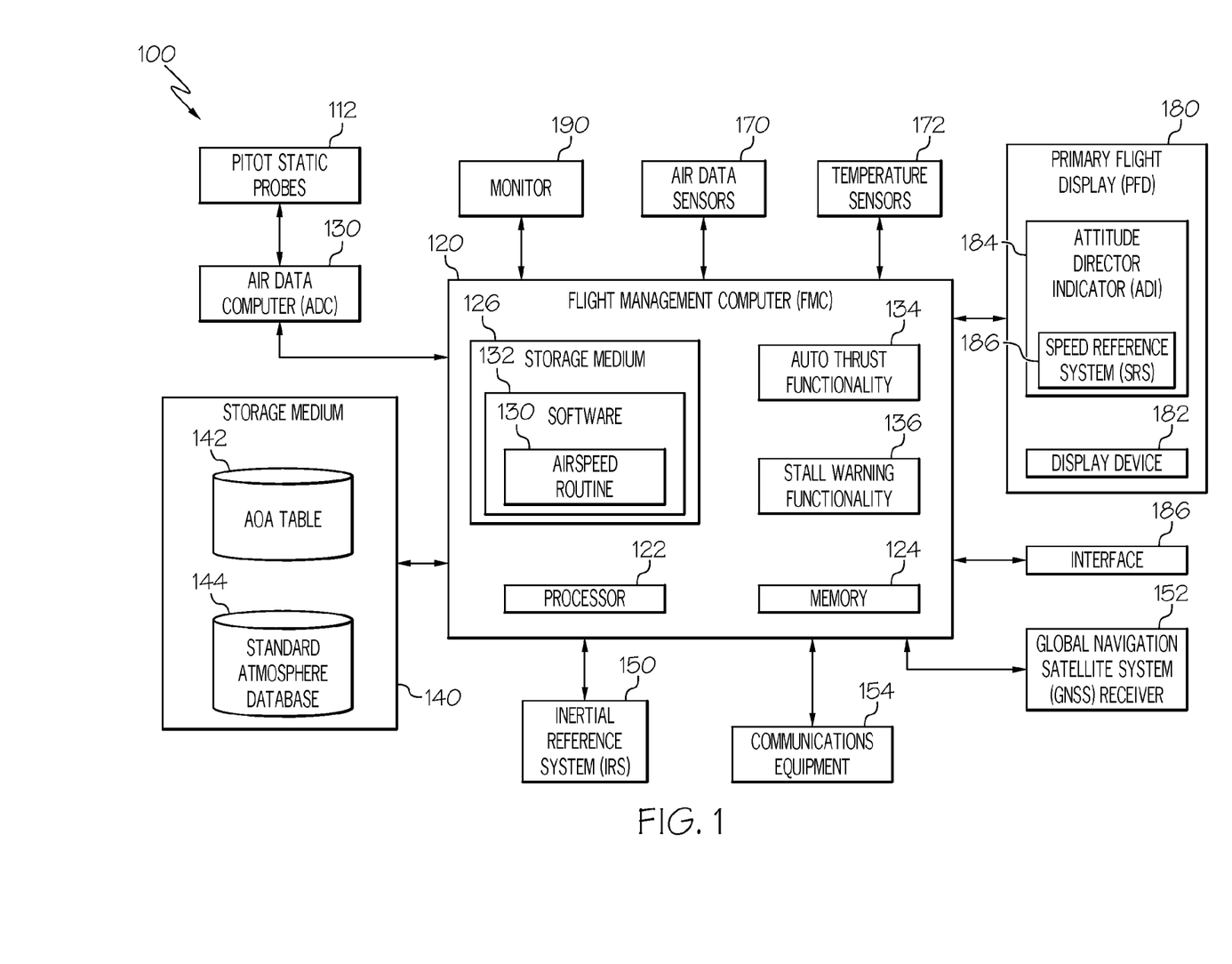
FIG. 1 is a block diagram of a known display system suitable for use in an aircraft in accordance with the exemplary embodiments described herein.

It should be understood that FIG. 1 is a simplified representation of one exemplary embodiment of an aircraft system 100 for purposes of explanation and ease of description, and FIG. 1 is not intended to limit the application or scope of the subject matter in any way. In practice, the aircraft system 100 will include numerous other devices and components for providing additional functions and features, as will be appreciated in the art.

Referring to FIG. 1, the system 100 and algorithms therein computes airspeed data for comparison with airspeed data from a primary airspeed data source and replacing thereof when unreliable or unavailable. For the embodiments described herein in connection with FIG. 1, the primary airspeed data source is an air data computer (ADC) 110. In other embodiments, the primary airspeed data source is implemented in another device that provides an avionics system with airspeed data accurate enough for controlling an aircraft and maintaining a safe flight. The airspeed provided by the primary airspeed data source is referred to herein as the primary airspeed. In one implementation, the avionics system 100 is installed onboard an aircraft.

When functioning properly, the ADC 110 provides flight data, especially data relating to the aircraft's airspeed, to a flight management computer (FMC) 120. The FMC 120 uses the data from the ADC 110 as an aid to control the aircraft. For example, the FMC 120 determines what level of thrust to maintain based on the airspeed determined by the ADC 110. In other embodiments of the avionics system 100, the FMC 120 communicates the airspeed and an engine pressure ratio (EPR) or N1 (first stage compressor rotations per minute) to maintain the airspeed of the aircraft to an external auto thrust control system, an automatic thrust functionality 134, or the like.

The ADC 110 receives airspeed data from pitot static probes 112. Typically, multiple redundant pitot static probes 112 are installed on the aircraft in order to increase the reliability of the ADC 110. The ADC 110 computes calibrated airspeed (CAS), Mach number, altitude, and altitude trend data from the information it receives from the pitot static probes 112. Calibrated airspeed (CAS) is the indicated airspeed for the aircraft corrected for errors, such as instrument errors, position errors, and installation errors. Indicated airspeed for the aircraft is an airspeed reading that is uncorrected for those errors. The FMC 120 uses the CAS of the aircraft for critical flight management and control functions. For example, without knowing the CAS of the aircraft, the FMC 120 does not know what thrust will maintain level flight or whether the aircraft is undergoing a stall. Another measure of airspeed of the aircraft, the true airspeed (TAS), is the speed of the aircraft relative to the air mass in which it is flying. As described herein, the TAS of the aircraft can be used for confirming that the ADC 110 is functioning properly and when the CAS of the aircraft from the primary airspeed data source is unavailable.

The ADC 110 is typically a redundant system with many safety features. Some aircraft may have more than one ADC 110 installed onboard. Despite these redundancies, the ADC 110 is not immune to failure. For example, one or all of the pitot static probes 112 may ice up, thereby providing incorrect data to the ADC 110, or the ADC 110 itself can fail. If the ADC 110 fails and there is no alternative source of airspeed information, an undesirable situation may occur within seconds. In aircraft with fly-by-wire flight control systems, the TAS of the aircraft is needed for controlling the aircraft. The FMC 120 is typically unable to fly the aircraft without a value for the true or calibrated airspeed of the aircraft. In order to avoid such undesirable situations, for the avionics system 100 shown in FIG. 1, the FMC 120 computes the flight data in situations where the ADC 110 fails. And while the ADC 110 may provide more accurate data, the data from the FMC 120 is more reliable and may be used to confirm that the ADC is functioning properly.

The FMC 120 comprises a processor 122, a memory 124, and an airspeed routine 130 that calculates flight information such as airspeed independently of the ADC 110. The airspeed routine 130 is implemented in software 132 that is executed by the processor 122. The software 132 comprises program instructions that are stored or otherwise embodied on or in a suitable storage device or medium 126. The storage medium 126 on or in which the program instructions are embodied is also referred to here as a "program product". The software 132 is operable, when executed by the processor 122, to cause the FMC 120 (and more generally the aircraft in which the FMC 120 is deployed) to carry out various functions described here as being performed by the FMC 120 (for example, at least a portion of the processing described below in connection with FIGS. 2-6).

The processor 122 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

Suitable storage devices or media 126 include, for example, forms of non-volatile memory, including by way of example, semiconductor memory devices (such as Erasable Programmable Read-Only Memory (EPROM), Electrically Erasable Programmable Read Only Memory (EEPROM), and flash memory devices), magnetic disks (such as Compact Disk-Read Only Memory (CD-ROM) disks). Moreover, the storage device or media 126 need not be local to the FMC 120 or the avionics system 100. In the embodiment described here, the storage device or medium 126 is non-transitory. Typically, a portion of the software 132 executed by the processor 122 and one or more data structures used by the software 132 during execution are stored in the memory 124. The memory 124 comprises, in one implementation of such an embodiment, any suitable form of random access memory (RAM) now known or later developed, such as dynamic random access memory (DRAM). In other embodiments, other types of memory are used. The components of the FMC 120 are communicatively coupled to one another as needed using suitable interfaces and interconnects.

The airspeed routine 130 calculates calibrated airspeed (CAS) of the aircraft and other flight information such as angle of incidence (a), ground speed (GS), and true airspeed (TAS). The angle of incidence (a) describes the angle between a reference line on the aircraft and the air through which the aircraft is moving. Ground speed (GS) is the speed of the aircraft with respect to the ground or terrain below.

The airspeed routine 130 uses data collected from sources other than those used by the ADC 110 to calculate the CAS, Mach number, and TAS for the aircraft. The data can be obtained, for example, from air data sensors 170, entered by a pilot, be received through communications equipment 154, or be determined by a global navigation satellite system (GNSS) receiver 152, or an inertial reference system (IRS) 150. In other words, the IRS 150, the GNSS 152, the communications equipment 154, or other suitable equipment, provides the ground track and ground speed of the aircraft. The ground track of an aircraft is the course of the aircraft traced on the surface of the Earth. In another embodiment of the airspeed routine 130, data from the pitot static sensors 112, when available, is used in calculating the CAS of the aircraft.

A monitor 190 records the indicated airspeed from one or more of the pitot static probes 112. The FMC 120 comprises additional functionality including the automatic thrust functionality 134 and a stall warning functionality 136. The auto thrust functionality 134 enables the FMC 120 to control the thrust of the aircraft. The stall warning functionality 136 provides warnings to a user (such as a pilot) if the aircraft enters a stall. Typically, if an indicated airspeed reduces rapidly, a stall warning is triggered in the cockpit and the aircraft's automatic thrust functionality 134 is disengaged or remains engaged. Examples of stall warnings that the stall warning functionality 136 initiates include an aural warning "STALL, STALL" or a visual stall warning displayed on a Primary Flight Display (PFD) 180. Another example of a stall warning is a stick shaker that vibrates a control yoke of the aircraft. Other stall warnings can also be used.

If any or all indicated airspeeds reduce rapidly without a corresponding change in angle of incidence of the aircraft, the stall warning functionality 136 should be disabled and the auto thrust functionality 134 freezes the aircraft's thrust at the current level. A rapid reduction in airspeed is one in which the indicated airspeed reduces rapidly without a corresponding change in angle of incidence. This indicates a failure of the pitot static probes 112 which in turn indicates a failure of the ADC 110. Thus, the auto thrust functionality 134 prevents thrust increasing due to the incorrect reduction in indicated airspeed if the auto thrust remains engaged. Therefore, the FMC 120 automatically disables stall warnings and maintains the aircraft's thrust at the current level if the airspeed from the primary airspeed data source (or the alternative airspeed source) reduces by more than a predetermined threshold rate.

In another embodiment of the avionics system 100, the IRS 150 generates a flight path vector (FPV) that indicates on the ADI 184 a flight path angle (FPA) and the track of the aircraft. The FPV is also referred to as a "bird" because the display typically resembles a bird. The FPV is displayed on the primary flight display 180 to enable a pilot to maintain level flight by aligning the wings of the bird with a horizontal on the ADI 184. Also, pitch attitude for the prevailing weight and altitude conditions are displayed on the ADI 184 in the form of a Speed Reference System (SRS) 186, enabling the pilot to maintain the calculated calibrated air speed, which can be either a single value or a mean of a plurality of values. The parameters of pitch, weight, altitude, or configurations versus $EPR/N_1$ information are available from the aircraft's Quick Reference Handbook (QRH) in the form of a table and can be stored in a database in the storage medium 140. The SRS 186 is enabled when the primary airspeed is unreliable (for example, during a failure of the pitot static probes 112) to guide and indicate to the pilot the aircraft's FPV and track, as well as the thrust setting and the pitch attitude to be maintained for the current weight and altitude of the aircraft.

Air data sensors 170 collect air data information and can include vane type sensors or the like. Temperature sensors 172 provide the temperature of the air external to the aircraft, which is used in determining the density of the air at altitude. The communications equipment 154 provides a communications link to the ground and can be used to receive information such as the ground speed of the aircraft or wind speed at the aircraft's atmospheric position. The communications equipment 154 can establish a radio link, a SATCOM link, or any other suitable communications link. An interface 186 provides a user (such as a pilot) the ability to enter information for calculation of the calibrated airspeed of the aircraft, for example, the aircraft's ground speed or wind speed obtained from the ground through a radio link. This information can be provided to the FMC 120. Embodiments of the interface 186 include a keyboard, a touchpad, or any other suitable interface now known or later developed.

In an exemplary embodiment, the communications equipment 154 is suitably configured to support data communication between the host aircraft and one or more remote systems. More specifically, the communications equipment 154 is used to receive data pertinent to the operation of the aircraft. The communications equipment 154 may be configured for compatibility with Automatic Dependant Surveillance-Broadcast (ADS-B) technology, with Traffic and Collision Avoidance System (TCAS) technology, and/or with similar technologies.

The inertial reference system (IRS) 150 senses the orientation of the IRS 150 with respect to the terrain to provide attitude data for the aircraft. In one implementation of the embodiment shown in FIG. 1, the IRS 150 includes an inertial measurement unit (IMU) that includes accelerometers and gyroscopes for sensing motion of the aircraft, such as a linear change in rate along a given axis and a change in angular rate. The IRS 150 can be used to determine information relating to the ground speed (GS) of the aircraft. The GNSS receiver 152 determines the position of the aircraft. The GNSS receiver 152 determines the position of the aircraft and is also configured to detect data relating to the ground speed. The ground speed information is provided to the FMC 120 for computation of the CAS of the aircraft.

A storage medium 140 stores an angle of incidence table 142 and a standard atmosphere database 144 used by the airspeed routine 130 in calculating the desired airspeed. The angle of incidence table 142 provides a relationship between the angle of incidence and coefficient of lift of the aircraft. The standard atmosphere database 144 provides the density of the air at a given altitude and temperature. Suitable storage devices or media 140 include, for example, forms of non-volatile memory, including by way of example, semiconductor memory devices (such as Erasable Programmable Read-Only Memory (EPROM), Electrically Erasable Programmable Read Only Memory (EEPROM), and flash memory devices), magnetic disks (such as Compact Disk-Read Only Memory (CD-ROM) disks). Moreover, the storage device or media 140 need not be local to the avionics system 100. In another embodiment of the avionics system 100, one or more of the angle of incidence table 142 and the standard atmosphere database 144 are stored in the storage medium 126.

The avionics system 100 further comprises a primary flight display 180. The primary flight display 180 displays flight information to a pilot on a display device 182 or an attitude director indicator (ADI) 184 located, for example, in a cockpit of the aircraft. The display device 182 can be any display device operable to display flight information such as airspeed data, for example a digital display, or an LCD monitor, an LED display. The attitude director indicator 184 is an instrument for displaying a pitch SRS (speed reference system) bar corresponding to the pitch of the aircraft appropriate to the weight, flight level, and thrust of the aircraft. The primary flight display 180 is configured to provide aural displays to the pilot, such as a stall warning. In other embodiments of the avionics system 100, the primary flight display 180 comprises any suitable display system that can display flight information.

In accordance with an exemplary embodiment, the display 180 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 180 may additionally be implemented as a panel mounted display, a HUD (head-up display) projection, or any one of numerous known technologies. It is additionally noted that the display 180 may be configured as any one of numerous types of aircraft flight deck displays. For example, it may be configured as a multi-function display, a horizontal situation indicator, or a vertical situation indicator. In the depicted embodiment, however, the display 180 is configured as a primary flight display (PFD).

The proposed system and method uses the existing sensors onboard in lieu of the one or more pitot static sensors and the ADC and does not warrant any other additional equipment. The aircraft weight is determined from the FMS, or from another source, by comparing the initial aircraft weight with fuel flow sensors data during flight. Current aircraft thrust is obtained from aircraft data, stored in a data table, or from the FMS. Angle of attack is available from the ADC or from vane sensors positioned, for example, on the wing. The coefficient of lift for the given angle of attack is determined from the aircraft data.

The current altitude may be obtained from the GPS or IRS. If the current altitude is obtained from a radio altimeter, then the ground height is considered for the altitude at sea level. For the sea level altitude, the ambient pressure Pa and density ρ are computed from the atmospheric data and temperature deviation from a standard model. From the basic equation of flight (equation 1 below), knowing the lift contributing wing surface area S, one can find the TAS (V). Knowing the relation ½ρSV2=(0.7)SPaM² we may derive equation (2) in which the only unknown is the Mach number. Thus, the TAS and Mach number can be computed using the altitude input solely from the GPS, IRS, radio altimeter and other onboard altitude measuring devices without reference to data provided by the pitot static sensor or the ADC.

$$V^2 = (n^*mg - T\sin\alpha)/(\tfrac{1}{2}\rho SCza) \quad (1)$$

$$M^2 = (n^*mg - T\sin\alpha)/(0.7 SPaCza) \quad (2)$$

FIGS. 2-6 illustrate the computation of TAS, Mach number, and depict the possible comparison between ADC data to that computed by the exemplary embodiments described herein. This provides a method of confirming the ADC data, and in some embodiments provides a warning that the ADC data may be unreliable and that the computed true airspeed or Mach number may provide the most accurate data.

Figure 2:
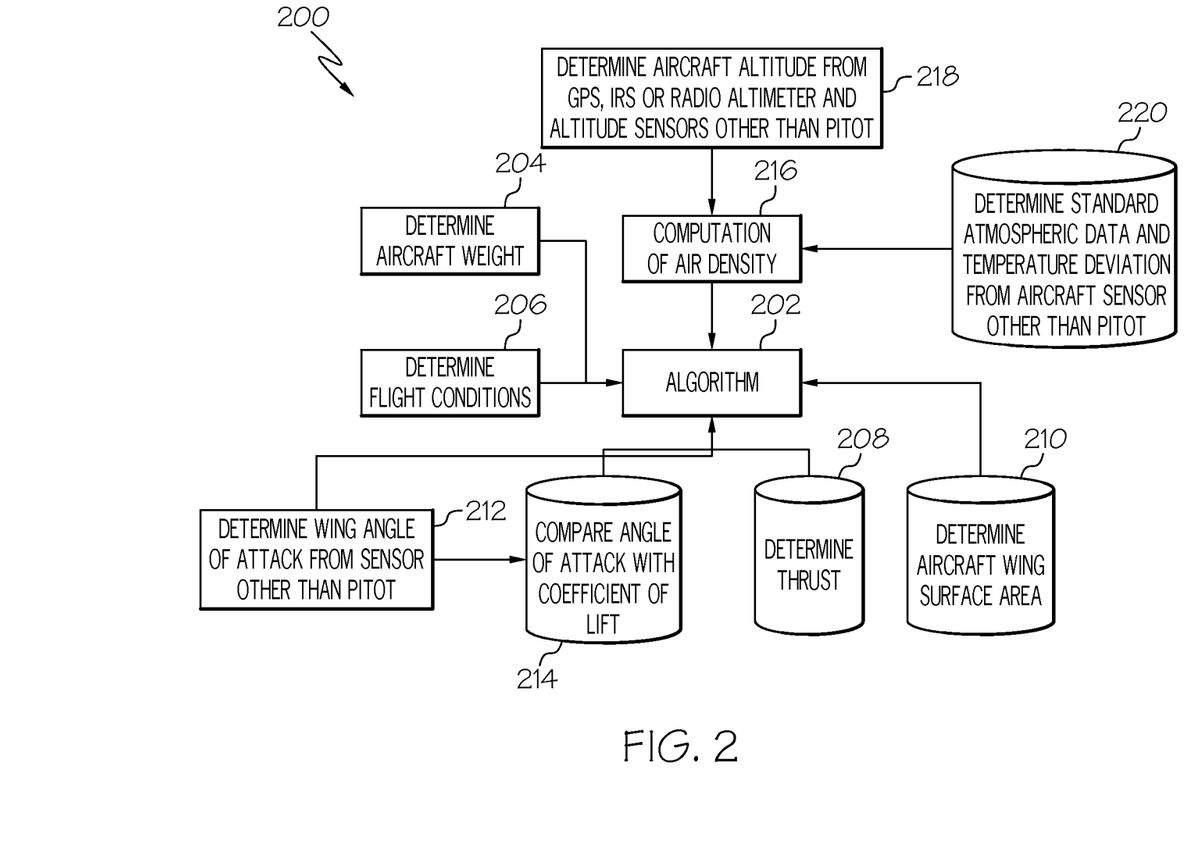
FIG. 2 is a block diagram of data supplied to the algorithm for determining true airspeed in accordance with a first exemplary embodiment.

In accordance with a first exemplary method, FIG. 2 depicts 200 providing of information to the algorithm 202 to determine the TAS, including determining the aircraft weight 204, flight conditions 206, thrust 208, wing surface area 210, and angle of attack 212. The angle of attack 212 is also compared with the coefficient of lift 214, with the output provided to the algorithm 202. Additionally, a computation of air density 216 is made from the aircraft altitude 218 and a determination 220 of standard atmospheric data and the effect of temperature deviation thereon, with an output of the computation of air density 216 being provided to the algorithm 202. The algorithm 202 then solves for the desired TAS as described above.

Figure 3:
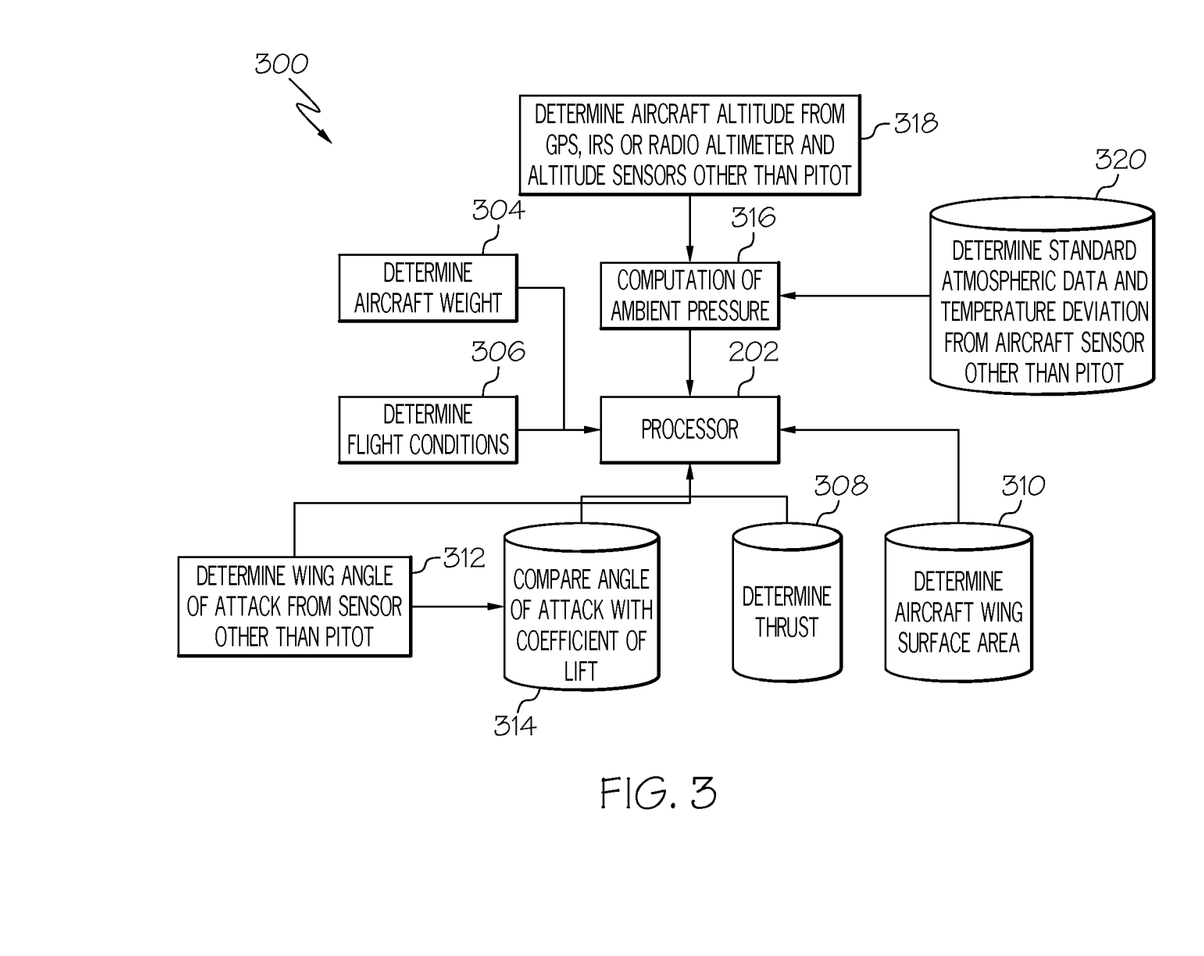
FIG. 3 is a block diagram of data supplied to the algorithm for determining Mach number in accordance with a second exemplary embodiment.
Figure 4:
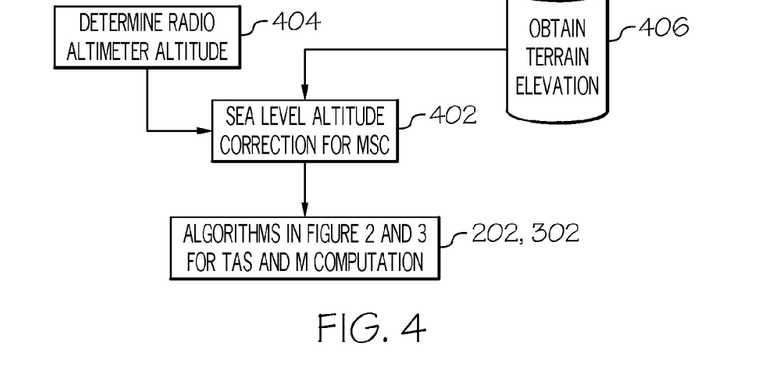
FIG. 4 is a flow diagram for determining the altitude from a radio altimeter in accordance with the exemplary embodiments.

In accordance with a second exemplary method, FIG. 3 depicts 300 providing information to the algorithm 302 for determining the Mach number, including determining the aircraft weight 304, flight conditions 306, thrust 308, wing surface area 310, and angle of attack 312. The angle of attack 312 is also compared with the coefficient of lift 314, with the output provided to the algorithm 302. Additionally, a computation of ambient pressure 316 is made from the aircraft altitude 318 and a determination 320 of standard atmospheric data and the effect of temperature deviation thereon, with an output of the computation of ambient pressure 316 being provided to the algorithm 302. The algorithm 302 then solves for the desired Mach number as described above.

Figure 5:
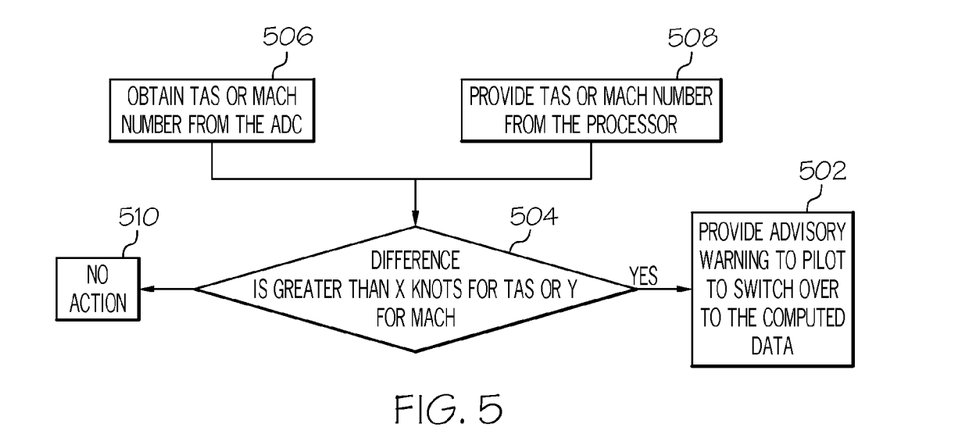
FIG. 5 is a flow diagram for providing an advisory warning in accordance with the exemplary embodiments.

The correction of altitude to mean sea level 402 (FIG. 4) is provided to the algorithm 202, 302, is some exemplary embodiments, as determined from a radio altimeter 404 and terrain elevation 406. FIG. 5 provides 502 an advisory warning to the pilot. If a difference 504 between the TAS or Mach number 506 from the ADC and that from the algorithm 508 disclosed herein is greater than a threshold, in some exemplary embodiments, an advisory warning is provided 502 to the pilot. If the threshold is not exceeded, no action is taken 510.

Figure 6:
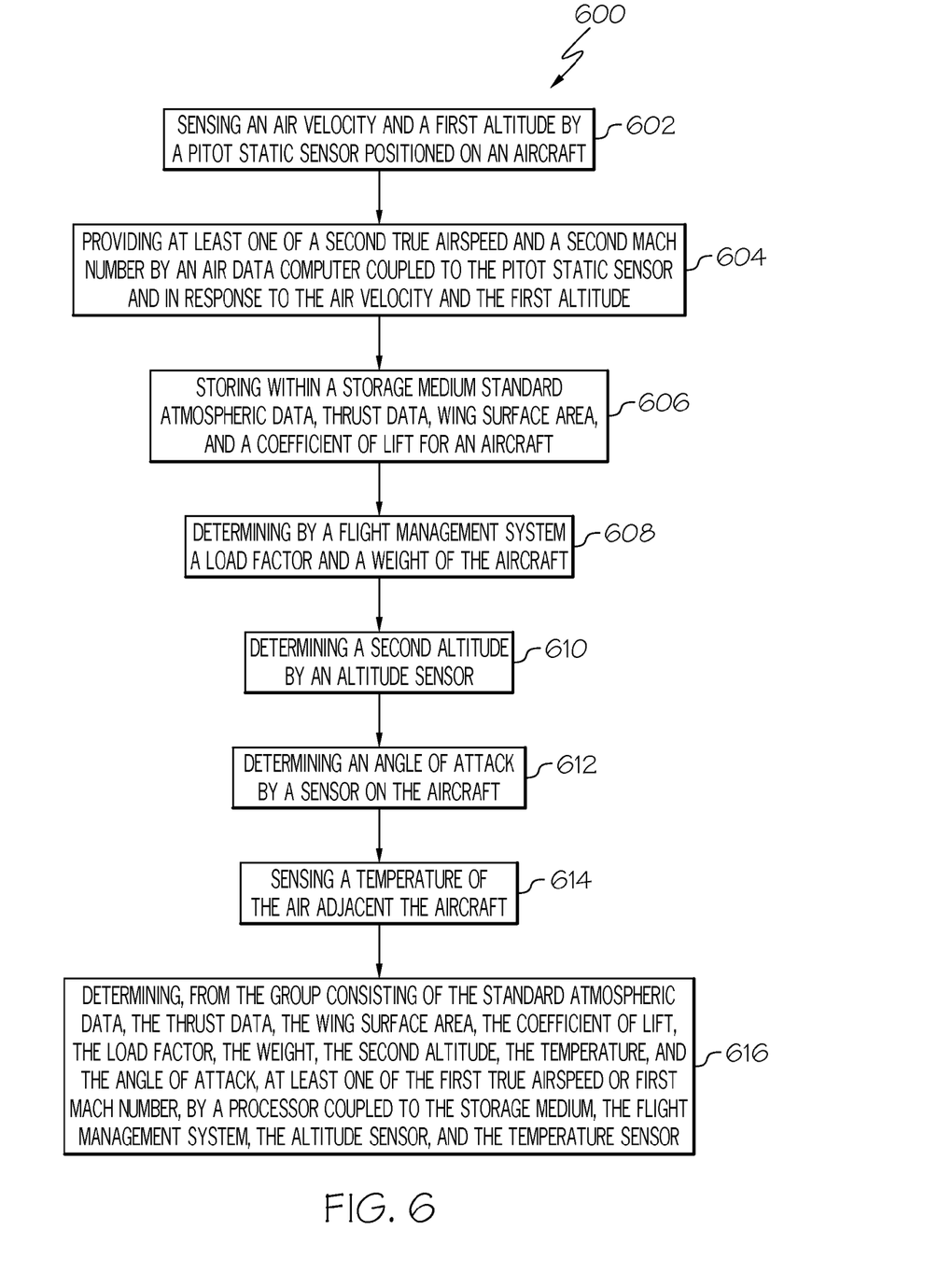
FIG. 6 is a flow diagram of a first exemplary method suitable for use with the display system of FIG. 1 in accordance with the exemplary embodiments.

FIG. 6 is a flow chart that illustrates an exemplary embodiment of a method 600 suitable for use with a flight deck display system 100. Method 600 represents one implementation of a method for displaying aircraft approaches or departures on an onboard display of a host aircraft. The various tasks performed in connection with method 600 may be performed by software, hardware, firmware, or any combination thereof. For illustrative purposes, the following description of method 600 may refer to elements mentioned above in connection with preceding FIGS. In practice, portions of method 600 may be performed by different elements of the described system, e.g., a processor, a display element, or a data communication component. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

Referring to FIG. 6, the first exemplary method 600 for determining at least one of a first true airspeed or a first Mach number of an aircraft in flight comprises sensing 602 an air velocity and a first altitude by a pitot static sensor; providing 604 at least one of a second true airspeed and a second Mach number by an air data computer coupled to the pitot static sensor and in response to the air velocity and the first altitude; storing 606 within a storage medium standard atmospheric data, thrust data, wing surface area, and a coefficient of lift for the aircraft; determining 608 by a flight management system a load factor and a weight of the aircraft; determining 610 a second altitude by an altitude sensor; determining 612 an angle of attack by a sensor on the aircraft; sensing 614 a temperature of the air adjacent the aircraft; and determining 616, from the group consisting of the standard atmospheric data, the thrust data, the wing surface area, the coefficient of lift, the load factor, the weight, the second altitude, the temperature, and the angle of attack, at least one of the first true airspeed or first Mach number, by a processor coupled to the storage medium, the flight management system, the altitude sensor, and the temperature sensor. Flight management systems is defined herein to include display systems/computers named otherwise in the industry.

Figure 7:
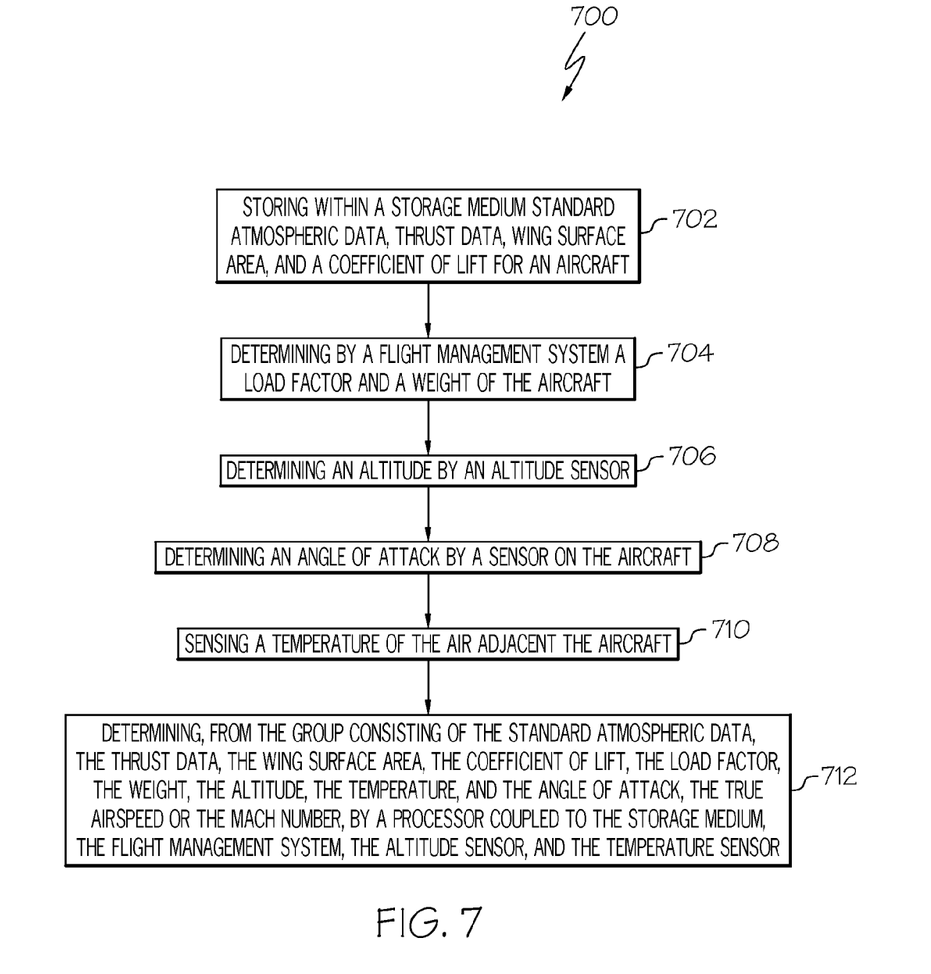
FIG. 7 is a flow diagram of a second exemplary method suitable for use with the display system of FIG. 1 in accordance with the exemplary embodiments.

A second exemplary method 700 (FIG. 7) includes storing 702 within a storage medium standard atmospheric data, thrust data, wing surface area, and a coefficient of lift for the aircraft; determining 704 by a flight management system a load factor and a weight of the aircraft; determining 706 an altitude by an altitude sensor; determining 708 an angle of attack by a sensor on the aircraft; sensing 710 a temperature of the air adjacent the aircraft; and determining 712, from the group consisting of the standard atmospheric data, the thrust data, the wing surface area, the coefficient of lift, the load factor, the weight, the altitude, the temperature, and the angle of attack, the true airspeed or the Mach number, by a processor coupled to the storage medium, the flight management system, the altitude sensor, and the temperature sensor.

To briefly summarize, the methods and systems described above compute the TAS and Mach number using the current altitude, weight, flight conditions, angle of attack, Temperature deviation and standard atmospheric table. The current altitude may be obtained from the GPS, the IRS or from a radio altimeter corrected to sea level altitude. The current altitude is not obtained from the ADC and therefore the dependency on pitot sensor data is absent. This computed TAS and Mach number could be used to validate the pitot based TAS and Mach number. Even though the pitot based TAS and Mach number are more accurate, a check when they differ beyond a threshold would suggest a failure of ADC. A precautionary warning could be given to pilot and inform him to switch over to the proposed computation data.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for determining at least one of a first true airspeed or a first Mach number of an aircraft in flight, comprising:

sensing an air velocity and a first altitude by a pitot static sensor;

providing at least one of a second true airspeed and a second Mach number by an air data computer coupled to the pitot static sensor and in response to the air velocity and the first altitude;

storing within a storage medium standard atmospheric data, thrust data, wing surface area, and a coefficient of lift for the aircraft;

determining by a flight management system a load factor and a weight of the aircraft;

determining a second altitude by an altitude sensor;

determining an angle of attack by a sensor on the aircraft;

sensing a temperature of the air adjacent the aircraft; and determining, from the group consisting of the standard atmospheric data, the thrust data, the wing surface area, the coefficient of lift, the load factor, the weight, the second altitude, the temperature, and the angle of attack, at least one of the first true airspeed or first Mach number, by a processor coupled to the storage medium, the flight management system, the altitude sensor, and the temperature sensor.

2. The method of claim 1 further comprising determining an air density from the standard atmospheric data, temperature, and the second altitude, and wherein determining the first true airspeed comprises determining by the equation $V^2=(n*mg-T \sin \alpha)/(\frac{1}{2}\rho SCza)$, where $V^2$ is the first true airspeed squared, n is the load factor, mg is the weight, $\rho$ is the air density, S is the wing surface area, Cza is the coefficient of lift, and T is the thrust, and $\alpha$ is the angle of attack.

3. The method of claim 1 further comprising determining an ambient pressure from the standard atmospheric data, and wherein determining the first Mach number comprises determining by the equation $M^2=(n*mg-T \sin \alpha)/(0.7SPaCza)$, where $M^2$ is the first Mach number squared, n is the load factor, mg is the weight, S is the wing surface area, Pa is the ambient air pressure, Cza is the coefficient of lift, T is the thrust, and $\alpha$ is the angle of attack.

4. The method of claim 1 wherein determining a second altitude consists of determining the second altitude by one of a global positioning system, an inertial reference system, or a radio altimeter.

5. The method of claim 1 wherein determining the load factor and the weight is determined by the flight management system.

6. A method of determining at least one of a true airspeed or a Mach number of an aircraft in flight, comprising:

storing within a storage medium standard atmospheric data, thrust data, wing surface area, and a coefficient of lift for the aircraft;

determining by a flight management system a load factor and a weight of the aircraft;

determining an altitude by an altitude sensor;

determining an angle of attack by a sensor on the aircraft;

sensing a temperature of the air adjacent the aircraft; and determining, from the group consisting of the standard atmospheric data, the thrust data, the wing surface area, the coefficient of lift, the load factor, the weight, the altitude, the temperature, and the angle of attack, the true airspeed or the Mach number, by a processor coupled to the storage medium, the flight management system, the altitude sensor, and the temperature sensor.

7. The method of claim 6 further comprising determining an air density from the standard atmospheric data, temperature, and the second altitude, and wherein determining the first true airspeed comprises determining by the equation $V^2=(n*mg-T \sin \alpha)/(\frac{1}{2}\rho SCza)$, where $V^2$ is the first true airspeed squared, n is the load factor, mg is the weight, $\rho$ is the air density, S is the wing surface area, Cza is the coefficient of lift, and T is the thrust, and $\alpha$ is the angle of attack.

8. The method of claim 6 further comprising determining an ambient pressure from the standard atmospheric data, and wherein determining the first Mach number comprises determining by the equation $M^2=(n*mg-T \sin \alpha)/(0.7SPaCza)$, where $M^2$ is the first Mach number squared, n is the load factor, mg is the weight, S is the wing surface area, Pa is the ambient air pressure, Cza is the coefficient of lift, T is the thrust, and $\alpha$ is the angle of attack.

9. The method of claim 6 wherein determining a second altitude consists of determining the second altitude by one of a global positioning system, an inertial reference system, or a radio altimeter.

10. The method of claim 6 wherein determining the load factor and the weight is determined by the flight management system.

11. A system for determining at least one of a first true airspeed or a first Mach number of an aircraft in flight, the system comprising:

a pitot static sensor configured to sense an air velocity and a first altitude;

an air data computer coupled to the pitot static sensor and configured to provide at least one of a second true airspeed and a second Mach number;

a storage medium configured to store standard atmospheric data, thrust data, wing surface area, and a coefficient of lift for the aircraft;

a flight management system configured to determine a load factor and a weight of the aircraft;

an altitude sensor configured to determine a second altitude;

a temperature sensor configured to determine a temperature;

a sensor configured to determine an angle of attack; and a processor coupled to the storage medium, the flight management system, the altitude sensor, and the temperature sensor, and configured to determine, from the group consisting of the standard atmospheric data, the thrust data, the wing surface area, the coefficient of lift, the load factor, the weight, the second altitude, the temperature, and an angle of attack, at least one of the first true airspeed or first Mach number.

12. The system of claim 11 wherein the flight management system is coupled to the air data computer and is further configured to:

determine a difference between one of the first true airspeed or the first Mach number and one of the second true airspeed or the second Mach number, respectively;

determine at least one of the second true airspeed and the second Mach number as valid when the difference does not exceed a threshold; and determine at least one of the first true airspeed and the first Mach number as valid when the difference exceeds the threshold.

13. The system of claim 11 further comprising determining an air density from the standard atmospheric data, temperature, and the second altitude, and wherein determining the first true airspeed comprises determining by the equation $V^2=(n*mg-T \sin \alpha)/(\frac{1}{2}\rho SCza)$, where $V^2$ is the first true airspeed squared, n is the load factor, mg is the weight, $\rho$ is the air density, S is the wing surface area, Cza is the coefficient of lift, and T is the thrust, and $\alpha$ is the angle of attack.

14. The system of claim 11 wherein the processor is further configured to:
   determine an ambient pressure from the standard atmospheric data, and wherein determining the first Mach number comprises determining by the equation $M^2 = (n*mg - T \sin \alpha)/(0.7 S P a C z a)$, where $M^2$ is the first Mach number squared, n is the load factor, mg is the weight, S is the wing surface area, Pa is the ambient air pressure, Cza is the coefficient of lift, T is the thrust, and $\alpha$ is the angle of attack.

15. The system of claim 11 further comprising:
   one of a global positioning system, an inertial reference system, or a radio altimeter configured to determine a second altitude.

16. The system of claim 11 wherein the flight management system is further configured to:
   determine the load factor and the weight.

* * * * *